(12) United States Patent
Fleniken et al.

(10) Patent No.: US 9,004,470 B2
(45) Date of Patent: Apr. 14, 2015

(54) JOUNCE BUMPER NOSE RETAINING FEATURE FOR A SHOCK ABSORBER

(71) Applicant: Tenneco Automotive Operating Company Inc., Lake Forest, IL (US)

(72) Inventors: Gregory Fleniken, Toledo, OH (US); Christopher Conrad, Ann Arbor, MI (US); Ben Schaller, Toledo, OH (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 69 days.

(21) Appl. No.: 13/787,941

(22) Filed: Mar. 7, 2013

(65) Prior Publication Data

US 2014/0252707 A1    Sep. 11, 2014

(51) Int. Cl.
*B60G 15/06*    (2006.01)
*B60G 13/08*    (2006.01)
*F16F 9/38*    (2006.01)
*F16F 9/58*    (2006.01)

(52) U.S. Cl.
CPC .............. *B60G 15/068* (2013.01); *B60G 13/08* (2013.01); *B60G 2204/45021* (2013.01); *F16F 9/38* (2013.01); *F16F 9/58* (2013.01)

(58) Field of Classification Search
CPC ................ F16F 9/54; B60G 15/067–15/068; B60G 2202/143
USPC ..................................... 267/220, 35, 292–293
See application file for complete search history.

(56) References Cited

U.S. PATENT DOCUMENTS

| | | | |
|---|---|---|---|
| 3,412,990 A * | 11/1968 | Gladstone | 267/220 |
| 4,771,994 A * | 9/1988 | Makita | 267/64.21 |
| 5,308,104 A | 5/1994 | Charles | |
| 5,775,720 A * | 7/1998 | Kmiec et al. | 188/322.15 |
| 6,186,486 B1 | 2/2001 | Gutman et al. | |
| 6,199,844 B1 | 3/2001 | McCormick et al. | |
| 7,997,395 B2 | 8/2011 | Ohkita et al. | |
| 8,123,203 B2 | 2/2012 | Patil et al. | |
| 2006/0043659 A1 | 3/2006 | Gofron et al. | |
| 2007/0017761 A1 | 1/2007 | Huprikar | |
| 2010/0213656 A1 | 8/2010 | Patil et al. | |
| 2012/0181127 A1 | 7/2012 | Keil et al. | |

FOREIGN PATENT DOCUMENTS

GB    2217663 A    * 11/1989

OTHER PUBLICATIONS

Search Report and Written Opinion dated Jul. 7, 2014 in corresponding PCT Application No. PCT/US2014/020340 (12 pages).

* cited by examiner

*Primary Examiner* — Anna Momper
(74) *Attorney, Agent, or Firm* — Harness, Dickey & Pierce, P.L.C.

(57) ABSTRACT

A shock absorber includes an elastomeric jounce bumper which engages a jounce bumper cap during relatively large compression movements of the shock absorber. The jounce bumper cap includes a jounce bumper nose retaining feature which engages the nose of the jounce bumper during the compression movements. The jounce bumper nose retaining feature restricts sliding movement of the elastomeric jounce bumper with respect to the jounce bumper cap to eliminate noises associated with the relative movement.

15 Claims, 8 Drawing Sheets

JOUNCE BUMPER NOSE RETAINING FEATURE FOR A SHOCK ABSORBER

FIELD

The present disclosure relates generally to hydraulic dampers or shock absorbers for use in a suspension system such as a suspension system used for automotive vehicles. More particularly, the present disclosure relates to a hydraulic damper or shock absorber which includes a jounce bumper nose retaining feature which interacts with the jounce bumper to eliminate sliding and noise.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to one of the sprung portion and the unsprung portion of the vehicle. The piston is connected to the other of the sprung portion and unsprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve may or may not contribute to the damping load. The damping valve on the piston closes the extension passages of the piston and a check valve on the base valve closes the extension passages of the base valve during a compression movement. During rebound movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve may or may not contribute to the damping load.

In a mono-tube shock absorber, the piston normally includes a plurality of compression passages and a plurality of extension passages. The shock absorber will also include means for compensating for the rod volume flow of fluid as is well known in the art. During jounce movements in a mono-tube shock absorber, the compression damping valve on the piston opens the compression passages in the piston to control fluid flow and produce a damping load. The extension damping valve on the piston closes the extension passages of the piston during a jounce movement. During rebound movements in a mono-tube shock absorber, the extension damping valve on the piston opens the extension passages in the piston to control fluid flow and produce a damping load. The compression damping valve on the piston closes the compression passages of the piston during a rebound movement.

Shock absorbers typically include an elastomeric jounce bumper which is disposed around the piston rod. During maximum compression of the shock absorber, the elastomeric jounce bumper contacts a jounce bumper cap which is attached to the shock absorber. Continued compression of the shock absorber compresses the elastomeric jounce bumper to dissipate energy. The jounce bumper cap is configured to protect the upper end of the shock absorber tubes and the seal assembly for the piston rod. During compression of the elastomeric jounce bumper, the elastomeric jounce bumper will typically slide relative to the jounce bumper cap causing unwanted noise.

SUMMARY

This section provides a general summary of the disclosure, and is not a comprehensive disclosure of its full scope or all of its features.

The present disclosure relates to a hydraulic damper or shock absorber which includes a jounce bumper cap nose retaining feature which interacts with the elastomeric jounce bumper to eliminate sliding of the elastomeric jounce bumper relative to the jounce bumper cap to eliminate the noise associated with this sliding movement. The feature incorporated into the jounce bumper cap in one embodiment is an annular protrusion which extends towards the elastomeric jounce bumper. In a second embodiment, the feature incorporated into the jounce bumper cap is a plurality of annular grooves which form a plurality of annular ridges or teeth. The feature incorporated into the jounce bumper cap changes the jounce bumper cap geometry so that the jounce bumper cap captures the nose of the elastomeric jounce bumper and thus the elastomeric jounce bumper compresses and does not slide relative to the jounce bumper cap. The profile of the annular protrusion is tunable based on the interaction of the elastomeric jounce bumper to prevent noise.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
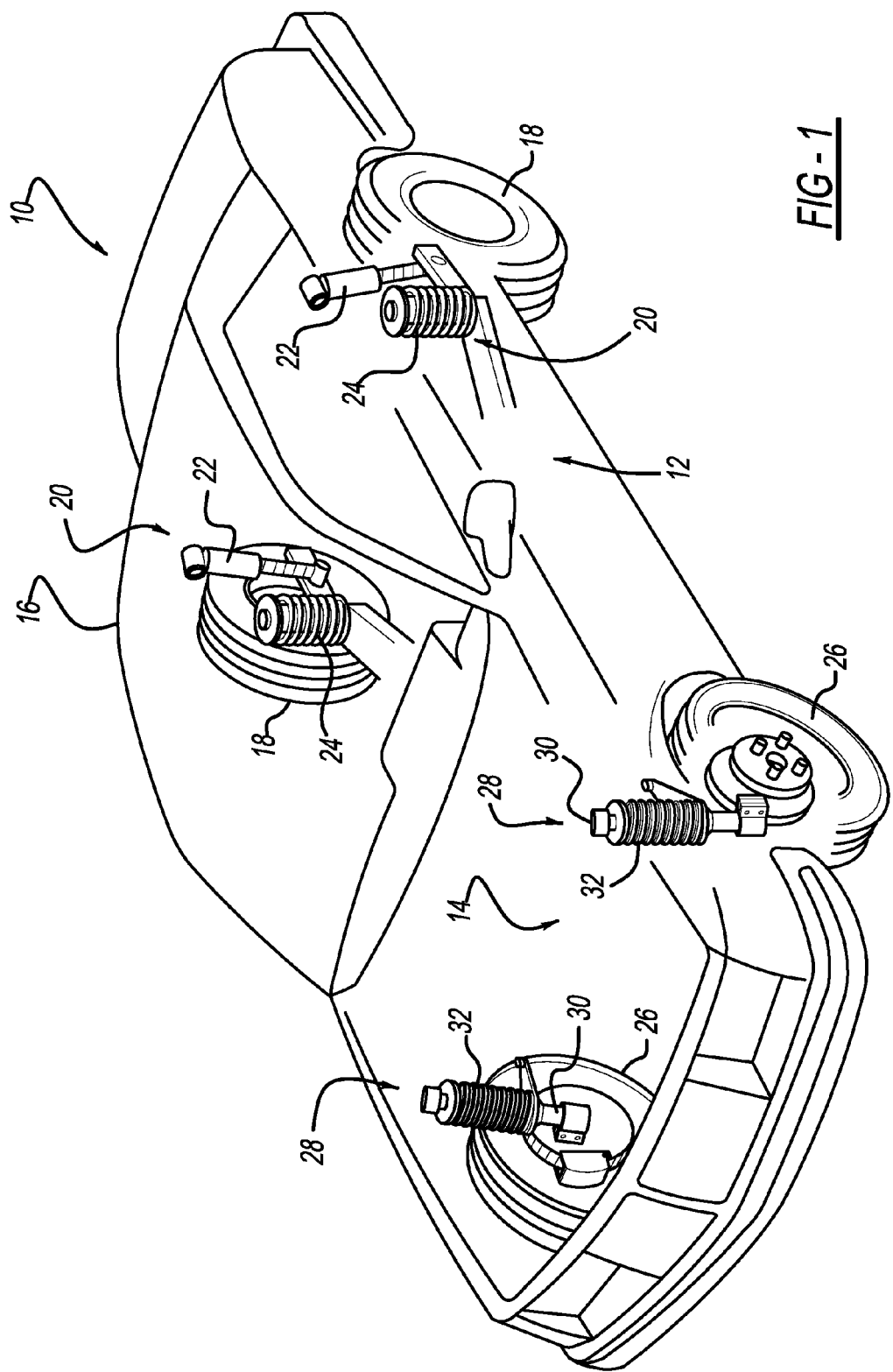
FIG. 1 is an illustration of an automobile using the shock absorber in accordance with the present disclosure.

There is shown in FIG. 1 a vehicle incorporating a suspension system having a shock absorber in accordance with the present disclosure and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of corner assemblies 20 which include a pair of shock absorbers 22 and a pair of helical coil springs 24. Similarly front suspension 14 includes a transversely extending front axle assembly (not shown) to operatively support the vehicle's front wheels 26. The front axle assembly is operatively connected to body 16 by means of a second pair of corner assemblies 28 which include a pair of shock absorbers 30 and by a pair of shaped helical coil springs 32. Shock absorbers 22 and 30 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 30, it is within the scope of the present invention to have rear suspension 12 incorporate a pair of struts or shock absorbers 30 if desired.

Figure 2:
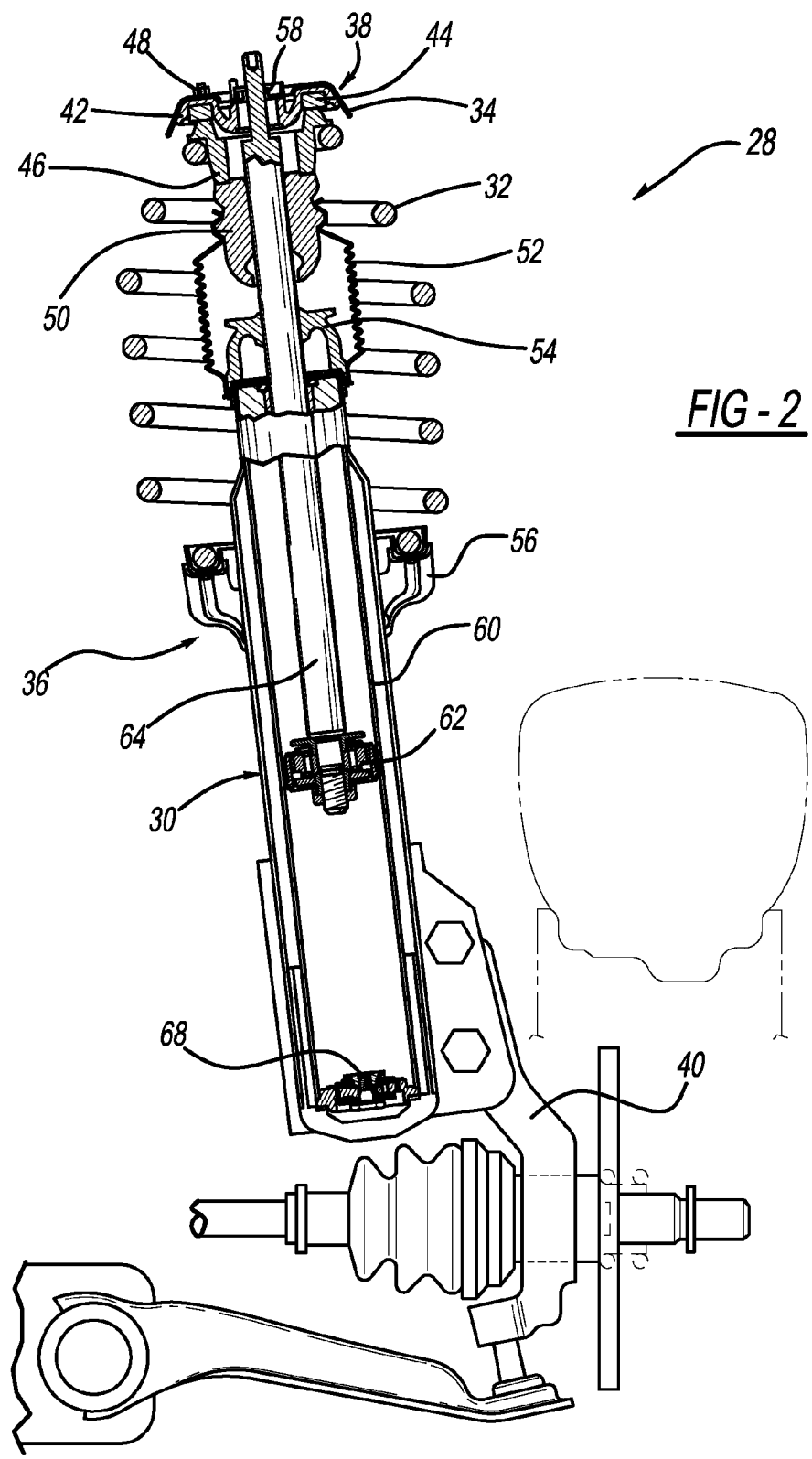
FIG. 2 is a side view of a corner assembly that incorporates the shock absorbers in accordance with the present disclosure.

Referring now to FIG. 2, the front corner assembly 28 for vehicle 10 is illustrated in greater detail. Body 16 defines a shock tower 34 comprising sheet metal of vehicle 10 within which is mounted a strut assembly 36 which comprises a telescoping device in the form of shock absorber 30, coil spring 32, a top mount assembly 38 and a knuckle 40. Strut assembly 36 including shock absorber 30, coil spring 32 and top mount assembly 38 are attached to vehicle 10 using shock tower 34. Top mount assembly 38 comprises a top mount 42, a bearing assembly 44 and an upper spring seat 46. Top mount 42 comprises an integral molded body and a rigid body member, typically made of stamped steel. Top mount assembly 38 is mounted to shock tower 34 by bolts 48. Bearing assembly 44 is friction fit within the molded body of top mount 42 to be seated in top mount 42 so that one side of bearing assembly 44 is fixed relative to top mount 42 and shock tower 34. The second side of bearing assembly 44 freely rotates with respect to the first side of bearing assembly 44, top mount 42 and shock tower 34.

The free rotating side of bearing assembly 44 carries upper spring seat 46 that is clearance fit to the outer diameter of bearing assembly 44. An elastomeric jounce bumper 50 is disposed between upper spring seat 46 and shock absorber 30. Elastomeric jounce bumper 50 comprises an elastomeric material which is protected by a plastic dirt shield 52. A jounce bumper cap 54 is located on shock absorber 30 to interface with elastomeric jounce bumper 50 and plastic dirt shield 52.

A lower spring seat 56 is attached to shock absorber 30 and coil spring 32 is disposed between upper spring seat 46 and lower spring seat 56 to isolate body 16 from front suspension 14. While shock absorber 30 is illustrated in FIG. 2, it is to be understood that shock absorber 22 may also include the features described herein for shock absorber 30.

Prior to the assembly of strut assembly 36 into vehicle 10, the pre-assembly of strut assembly 36 is performed. Jounce bumper cap 54, elastomeric jounce bumper 50 and plastic dirt shield 52 are assembled to shock absorber 30. Coil spring 32 is assembled over shock absorber 30 and positioned within lower spring seat 56. Upper spring seat 46 is assembled onto shock absorber 30 and correctly positioned with respect to coil spring 32. Bearing assembly 44 is positioned on top of upper spring seat 46 and top mount 42 is positioned on top of bearing assembly 44. This entire assembly is positioned within an assembly machine which compresses coil spring 32 such that the end of shock absorber 30 extends through a bore located within top mount assembly 38. A retaining nut 58 is threadingly received on the end of shock absorber 30 to secure the assembly of strut assembly 36.

Top mount 42 is designed as an identical component for the right and left hand sides of the vehicle but it has a different orientation with respect to shock absorber 30 and its associated bracketry when it is placed on the right or left side of the vehicle.

Figure 3:
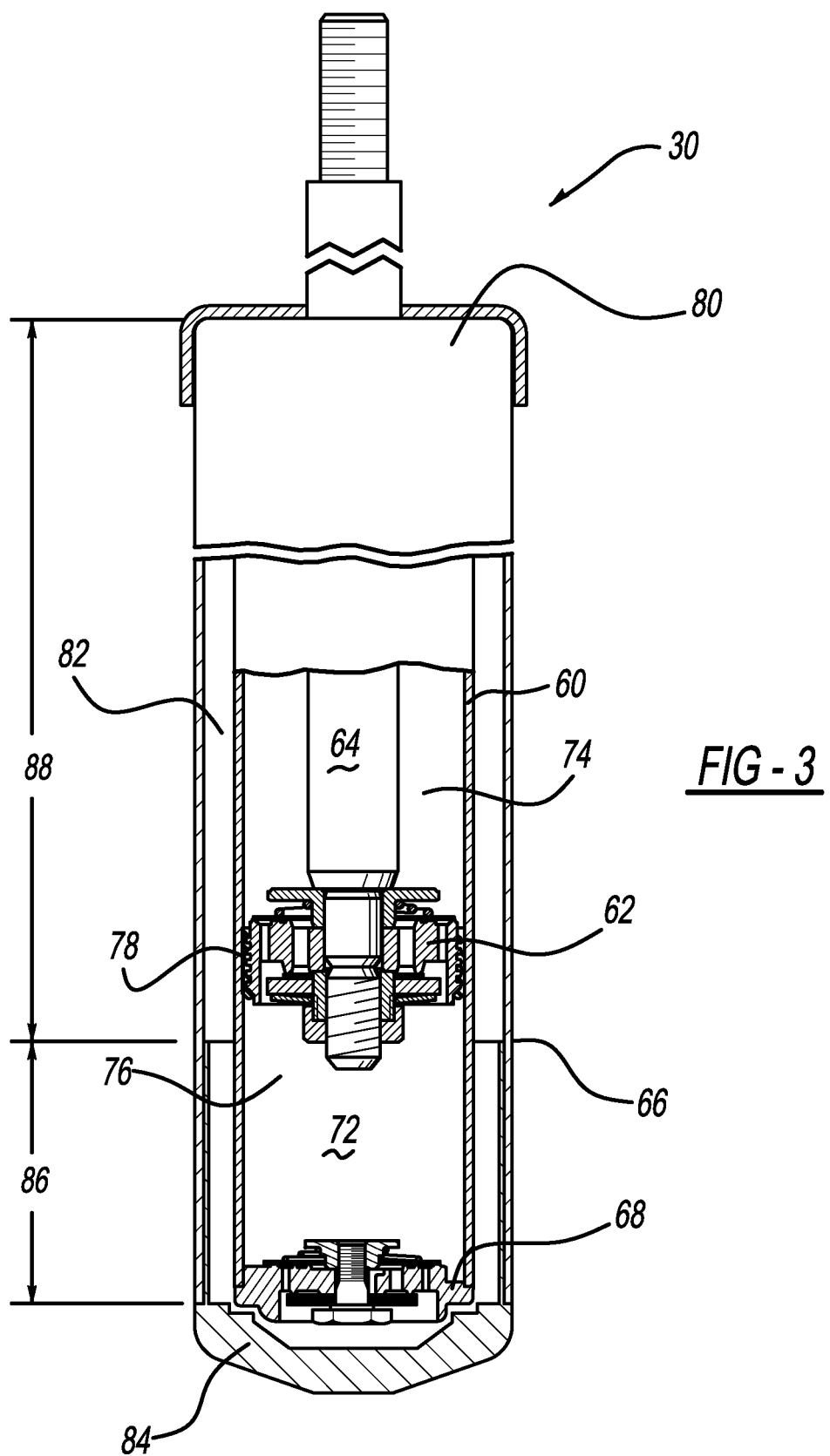
FIG. 3 is a side sectional view of a shock absorber which incorporates the nose cap retaining feature on the jounce bumper cap.

Referring now to FIG. 3, shock absorber 30 is shown in greater detail. While FIG. 3 illustrates only shock absorber 30, it is to be understood that shock absorber 22 could also be a part of a strut assembly and include the reinforcement described below for shock absorber 30. Shock absorber 30 comprises a pressure tube 60, a piston assembly 62, a piston rod 64, a reserve tube assembly 66 and a base valve assembly 68.

Pressure tube 60 defines a fluid chamber 72. Piston assembly 62 is slideably disposed within pressure tube 60 and divides fluid chamber 72 into an upper working chamber 74 and a lower working chamber 76. A seal 78 is disposed between piston assembly 62 and pressure tube 60 to permit sliding movement of piston assembly 62 with respect to pressure tube 60 without generating undue frictional forces as well as sealing upper working chamber 74 from lower working chamber 76. Piston rod 64 is attached to piston assembly 62 and extends through upper working chamber 74 and through an upper end cap 80 which closes the upper end of pressure tube 60. A sealing system seals the interface between upper end cap 80, reserve tube assembly 66 and piston rod 64. The end of piston rod 64 opposite to piston assembly 62 is adapted to be secured to top mount assembly 38 and to the sprung portion of vehicle 10 as discussed above. Valving within piston assembly 62 controls the movement of fluid between upper working chamber 74 and lower working chamber 76 during movement of piston assembly 62 within pressure tube 60. Because piston rod 64 extends only through upper working chamber 74 and not lower working chamber 76, movement of piston assembly 62 with respect to pressure tube 60 causes a difference in the amount of fluid displaced in upper working chamber 74 and the amount of fluid displaced in lower working chamber 76. The difference in the amount of fluid displaced is known as the "rod volume" and it flows through base valve assembly 68.

Reserve tube assembly 66 surrounds pressure tube 60 to define a fluid reservoir chamber 82 located between pressure tube 60 and reserve tube assembly 66. The bottom end of reserve tube assembly 66 is closed by an end cap 84. While end cap 84 is illustrated as a separate component, it is within the scope of the present disclosure to have end cap 84 integral with reserve tube assembly 66. The upper end of reserve tube assembly 66 is attached to upper end cap 80. The lower end of reserve tube assembly 66 defines a reinforced portion 86 which interfaces with knuckle 40. The remaining length of reserve tube assembly 66 defines a non-reinforced portion 88. Base valve assembly 68 is disposed between lower working chamber 76 and reservoir chamber 82 to control the flow of fluid between chambers 76 and 82. When shock absorber 30 extends in length, an additional volume of fluid is needed in lower working chamber 76 due to the "rod volume" concept. Thus, fluid will flow from reservoir chamber 82 to lower working chamber 76 through base valve assembly 68 as detailed below. When shock absorber 30 compresses in length, an excess of fluid must be removed from lower working chamber 76 due to the "rod volume" concept. Thus, fluid will flow from lower working chamber 76 to reservoir chamber 82 through base valve assembly 68 as detailed below.

Figure 4:
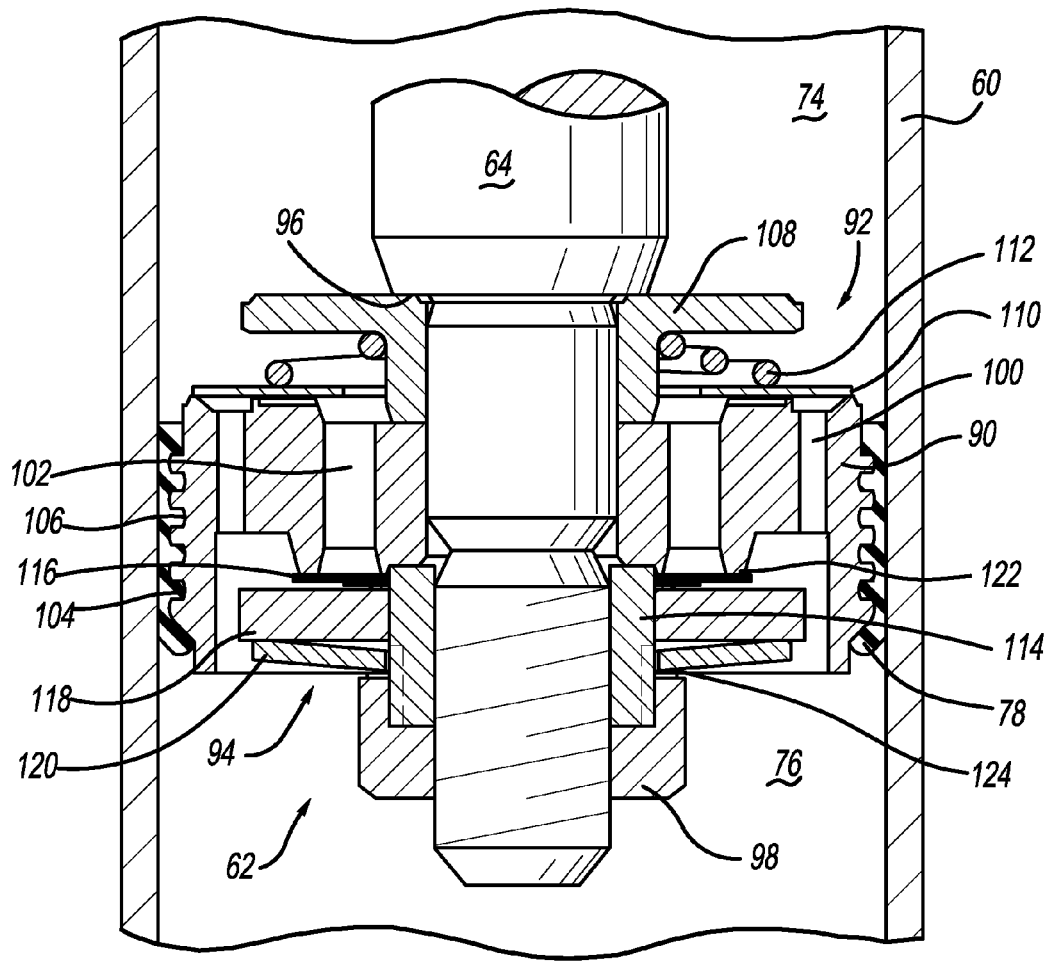
FIG. 4 is an enlarged side view, partially in cross-section, of the piston assembly from the shock absorber illustrated in FIG. 3.

Referring now to FIG. 4, piston assembly 62 comprises a piston body 90, a compression valve assembly 92 and a rebound valve assembly 94. Compression valve assembly 92 is assembled against a shoulder 96 on piston rod 64. Piston body 90 is assembled against compression valve assembly 92 and rebound valve assembly 94 is assembled against piston body 90. A nut 98 secures these components to piston rod 64.

Piston body 90 defines a plurality of compression passages 100 and a plurality of rebound passages 102. Seal 78 includes a plurality of ribs 104 which mate with a plurality of annular grooves 106 to restrict sliding movement of seal 78 relative to piston body 90 as piston assembly 62 slides in pressure tube 60.

Compression valve assembly 92 comprises a retainer 108, a valve disc 110 and a spring 112. Retainer 108 abuts shoulder 96 on one end and piston body 90 on the other end. Valve disc 110 abuts piston body 90 and closes compression passages 100 while leaving rebound passages 102 open. Spring 112 is disposed between retainer 108 and valve disc 110 to bias valve disc 110 against piston body 90. During a compression stroke, fluid in lower working chamber 76 is pressurized causing fluid pressure to react against valve disc 110. When the fluid pressure against valve disc 110 overcomes the biasing load of spring 112, valve disc 110 separates from piston body 90 to open compression passages 100 and allow fluid flow from lower working chamber 76 to upper working chamber 74. The damping characteristics for shock absorber 30 during a compression stroke of shock absorber 30 can be controlled by compression valve assembly 92 and/or base valve assembly 68 which accommodates the flow of fluid from lower working chamber 76 to reservoir chamber 82 due to the "rod volume" concept as detailed below. During a rebound stroke, compression passages 100 are closed by valve disc 110.

Rebound valve assembly 94 comprises a spacer 114, a plurality of valve discs 116, a retainer 118 and a spring 120. Spacer 114 is threadingly received on piston rod 64 and is disposed between piston body 90 and nut 98. Spacer 114 retains piston body 90 and compression valve assembly 92 while permitting the tightening of nut 98 without compressing either valve disc 110 or valve discs 116. Retainer 108, piston body 90 and spacer 114 provide a continuous solid connection between shoulder 96 and nut 98 to facilitate the tightening and securing of nut 98 to spacer 114 and thus to piston rod 64. Valve discs 116 are slidingly received on spacer 114 and abut piston body 90 to close rebound passages 102 while leaving compression passages 100 open. Retainer 118 is also slidingly received on spacer 114 and it abuts valve discs 116. Spring 120 is assembled over spacer 114 and is disposed between retainer 118 and nut 98 which is threadingly received on spacer 114. Spring 120 biases retainer 118 against valve discs 116 and valve discs 116 against piston body 90. Valve discs 116 includes at least one slot 122 which permits a limited amount of bleed flow bypassing rebound valve assembly 94. When fluid pressure is applied to valve discs 116, they will elastically deflect at the outer peripheral edge to open rebound valve assembly 94. A shim 124 is located between nut 98 and spring 120 to control the preload for spring 120 and thus the blow off pressure as described below. Thus, the calibration for the blow off feature of rebound valve assembly 94 is separate from the calibration for compression valve assembly 92.

During a rebound stroke, fluid in upper working chamber 74 is pressurized causing fluid pressure to react against valve discs 116. When the fluid pressure reacting against valve discs 116 overcomes the bending load for valve discs 116, valve discs 116 elastically deflect opening rebound passages 102 allowing fluid flow from upper working chamber 74 to lower working chamber 76. The strength of valve discs 116 and the size of rebound passages 102 will determine the damping characteristics for shock absorber 30 in rebound. Prior to the deflection of valve discs 116, a controlled amount of fluid flows from upper working chamber 74 to lower working chamber 76 through slot 122 to provide low speed tunability. When the fluid pressure within upper working chamber 74 reaches a predetermined level, the fluid pressure will overcome the biasing load of spring 120 causing axial movement of retainer 118 and the plurality of valve discs 116. The axial movement of retainer 118 and valve discs 116 fully opens rebound passages 102 thus allowing the passage of a significant amount of damping fluid creating a blowing off of the fluid pressure which is required to prevent damage to shock absorber 30 and/or vehicle 10. Additional fluid required to be added to lower working chamber 76 due to the "rod volume" concept will flow through base valve assembly 68.

Figure 5:
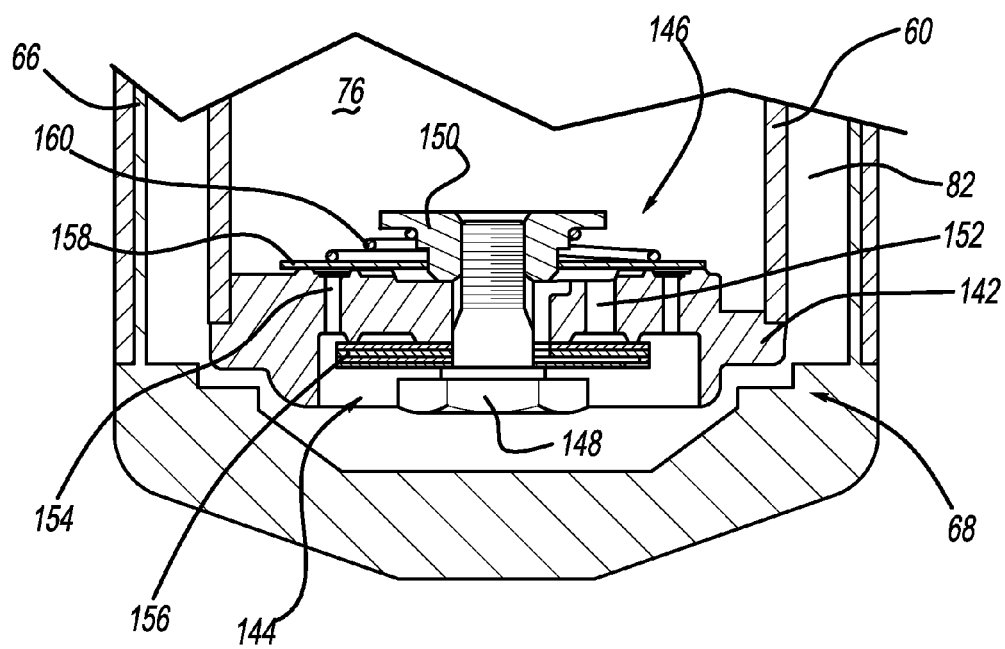
FIG. 5 is an enlarged side view, partially in cross-section of the base valve assembly from the shock absorber illustrated in FIG. 3.

Referring to FIG. 5, base valve assembly 68 comprises a valve body 142, a compression valve assembly 144 and a rebound valve assembly 146. Compression valve assembly 144 and rebound valve assembly 146 are attached to valve body 142 using a bolt 148 and a nut 150. The tightening of nut 150 biases compression valve assembly 144 towards valve body 142. Valve body 142 defines a plurality of compression passages 152 and a plurality of rebound passages 154.

Compression valve assembly 144 comprises a plurality of valve discs 156 that are biased against valve body 142 by bolt 148 and nut 150. During a compression stroke, fluid in lower working chamber 76 is pressurized and the fluid pressure within compression passages 152 will eventually open compression valve assembly 144 by deflecting valve discs 156. Compression valve assembly 92 of piston assembly 62 will allow fluid flow from lower working chamber 76 to upper working chamber 74 and only the "rod volume" will flow through compression valve assembly 144. The damping characteristics for shock absorber 30 are determined by the design of compression valve assembly 144 of base valve assembly 68 and can also be determined by compression valve assembly 92.

Rebound valve assembly 146 comprises a valve disc 158 and a valve spring 160. Valve disc 158 abuts valve body 142 and closes rebound passages 154. Valve spring 160 is disposed between nut 150 and valve disc 158 to bias valve disc 158 against valve body 142. During a rebound stroke, fluid in lower working chamber 76 is reduced in pressure causing fluid pressure in reservoir chamber 82 to react against valve disc 158. When the fluid pressure against valve disc 158 overcomes the biasing load of valve spring 160, valve disc 158 separates from valve body 142 to open rebound passages 154 and allow fluid flow from reservoir chamber 82 to lower working chamber 76. The damping characteristics for a rebound stroke can be controlled by rebound valve assembly 94 as detailed above and can also be controlled by rebound valve assembly 146.

Figure 6:
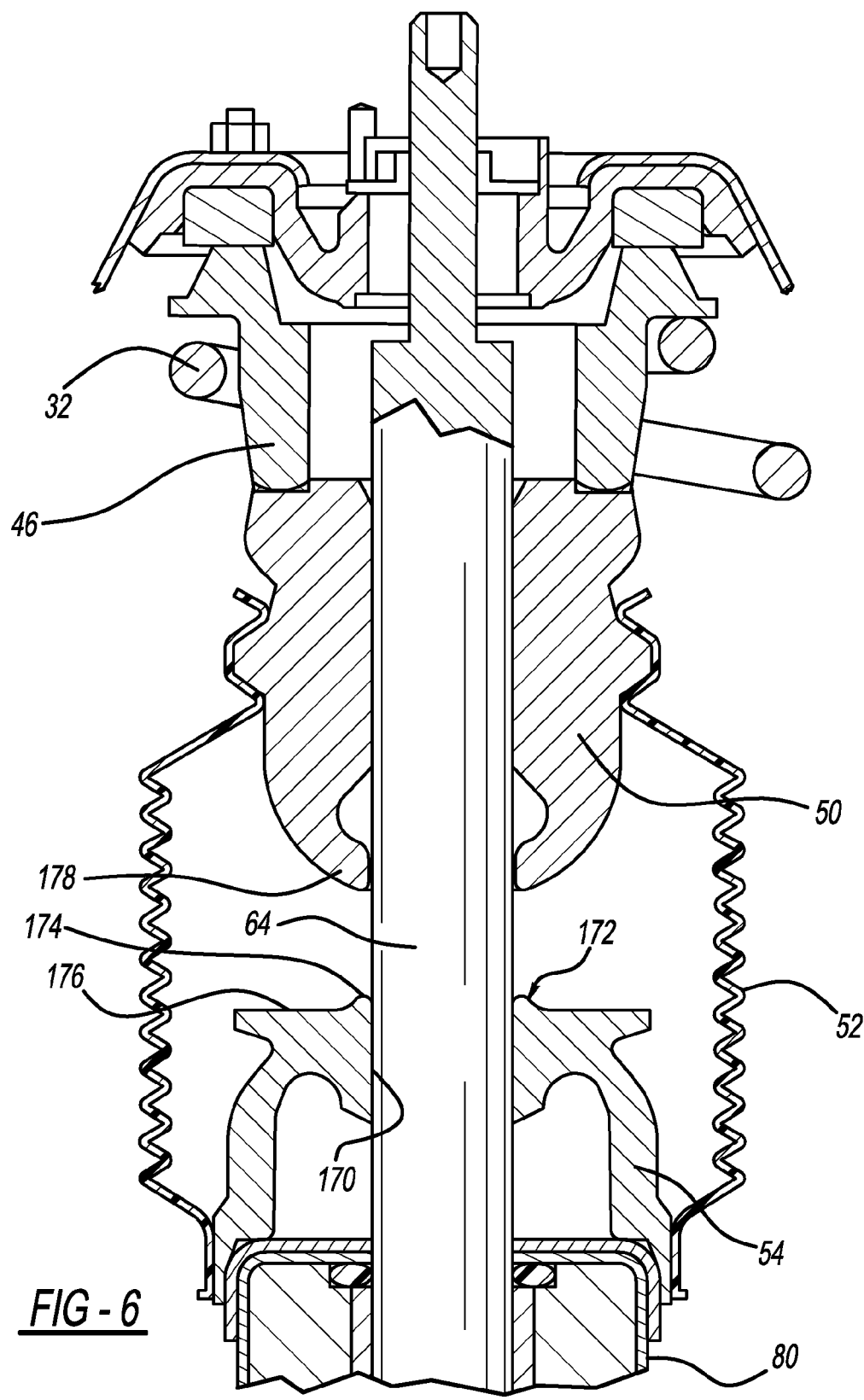
FIG. 6 is an enlarged cross-section of the elastomeric jounce bumper and the jounce bumper cap for the shock absorber in FIG. 3.
Figure 7:
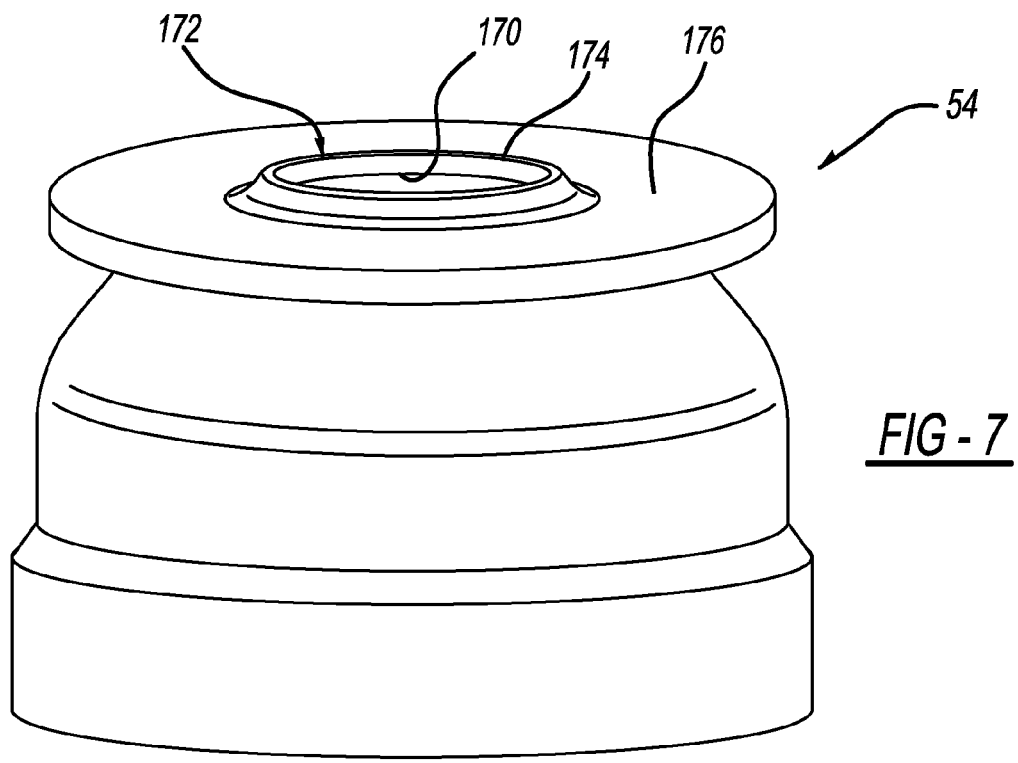
FIG. 7 is a perspective view of the jounce bumper cap illustrated in FIG. 6.
Figure 8:
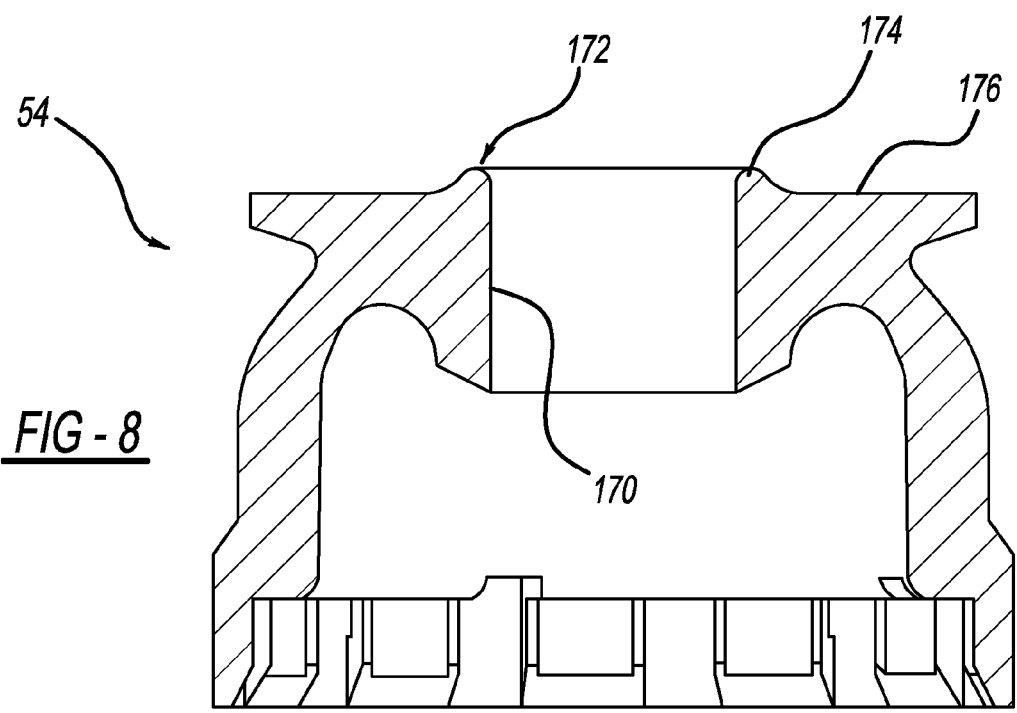
FIG. 8 is a side view in cross-section of the jounce bumper cap illustrated in FIG. 7.

Referring now to FIGS. 6-8, elastomeric jounce bumper 50 and jounce bumper cap 54 are illustrated in greater detail. Elastomeric jounce bumper 50 is an elastomeric member which extends from upper spring seat 46 toward jounce bumper cap 54 and upper end cap 80 along piston rod 64. Elastomeric jounce bumper 50 is an annular member which fully encircles piston rod 64.

Jounce bumper cap 54 is an annular member made from plastic, a polymer or metal which defines a through bore 170 through which piston rod 64 extends. A jounce bumper nose retaining feature 172 in the form of an annular protrusion 174 extends around through bore 170 and extends axially in a direction facing or toward elastomeric jounce bumper 50. Jounce bumper cap 54 defines an interface surface 176 which extends radially outward from jounce bumper nose retaining feature 172. During compression of elastomeric jounce bumper 50, interface surface 176 defines a stop for elastomeric jounce bumper 50 which causes the compression of elastomeric jounce bumper 50. The end of jounce bumper cap 54 opposite to interface surface 176 defines an engagement surface which is configured to mate with the outer surface of upper end cap 80.

During a compression stroke for shock absorber 30, when shock absorber 30 nears its fully compressed condition, a nose 178 of elastomeric jounce bumper 50 will first contact jounce bumper retaining feature 172. Further compression of shock absorber 30 will cause jounce bumper nose retaining feature 172 to locally compress nose 178 and nose 178 will eventually engage interface surface 176. Further compression of shock absorber 30 will cause further compression of elastomeric jounce bumper 50 and further engagement with interface surface 176. Jounce bumper nose retaining feature 172 provides a retaining function which reduces or eliminates any radial movement of elastomeric jounce bumper 50 with respect to interface surface 176 of jounce bumper cap 54 to eliminate any noise generation generated by the sliding motion of elastomeric jounce bumper 50 along interface surface 176.

Figure 9:
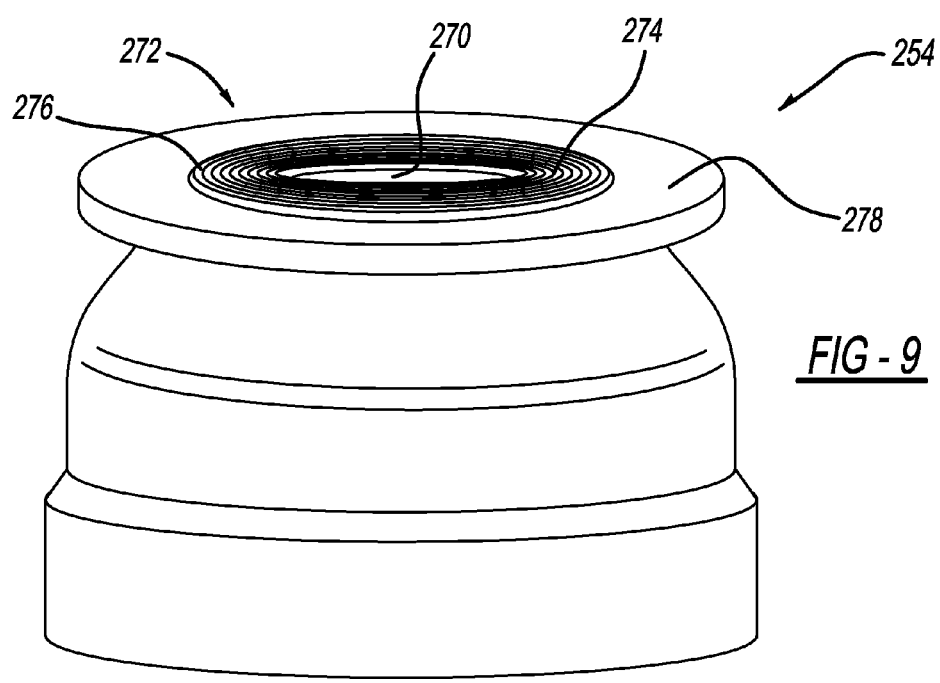
FIG. 9 is a perspective view of a jounce bumper cap in accordance with another embodiment of the present disclosure.
Figure 10:
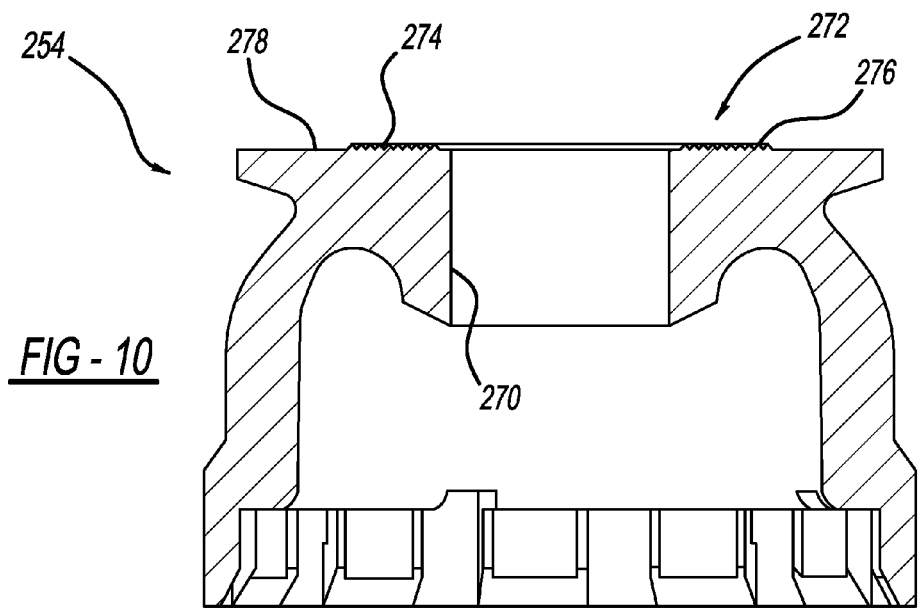
FIG. 10 is a side view in cross-section of the jounce bumper cap illustrated in FIG. 9.

Referring now to FIGS. 9 and 10, a jounce bumper cap 254 in accordance with another embodiment of the present disclosure is illustrated. Jounce bumper cap 254 is the same as jounce bumper cap 54 except for the jounce bumper retaining feature.

Jounce bumper cap 254 is an annular member made from plastic, a polymer or metal which defines a through bore 270 through which piston rod 64 extends. A jounce bumper nose retaining feature 272 in the form of a plurality of grooves 274 which form a plurality of annular ridges or teeth 276 extends around through bore 170 and extends in a direction facing or toward elastomeric jounce bumper 50. Jounce bumper cap 254 defines an interface surface 278 which extends radially outward from jounce bumper nose retaining feature 272. During compression of elastomeric jounce bumper 50, interface surface 278 defines a stop for elastomeric jounce bumper 50 which causes the compression of elastomeric jounce bumper 50. The end of jounce bumper cap 254 opposite to interface surface 278 defines an engagement surface which is configured to mate with the outer surface of upper end cap 80.

During a compression stroke for shock absorber 30, when shock absorber 30 nears its fully compressed condition, nose 178 of elastomeric jounce bumper 50 will first contact jounce bumper retaining feature 272. Further compression of shock absorber 30 will cause jounce bumper nose retaining feature 272 to locally compress nose 178 and nose 178 will eventually engage interface surface 278. Further compression of shock absorber 30 will cause further compression of elastomeric jounce bumper 50 and further engagement with interface surface 278. Jounce bumper nose retaining feature 272 provides a retaining function which reduces or eliminates any radial movement of elastomeric jounce bumper 50 with respect to interface surface 278 of jounce bumper cap 254 to eliminate any noise generation generated by the sliding motion of elastomeric jounce bumper 50 along interface surface 278.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
a pressure tube defining a fluid chamber;
a piston assembly slidably disposed within said fluid chamber, said piston assembly dividing said fluid chamber into an upper working chamber and a lower working chamber;
a piston rod attached to said piston assembly, said piston rod extending through one of said upper and lower working chambers;
a jounce bumper cap disposed at an end of said pressure tube, said piston rod extending through a through bore defined by said jounce bumper cap;
a jounce bumper nose retaining feature disposed around said through bore defined by said jounce bumper cap;
an elastomeric jounce bumper disposed around said piston rod, said elastomeric jounce bumper having a nose configured to engage said jounce bumper nose retaining feature, said jounce bumper nose retaining feature extending toward said elastomeric jounce bumper to increase a cross-sectional thickness of said jounce bumper cap; wherein
engagement between said nose of said elastomeric jounce bumper and said jounce bumper nose retaining feature during a compression movement of said shock absorber restricts radial movement of said nose with respect to said jounce bumper nose retaining feature.

2. The shock absorber according to claim 1, wherein a single piece component forms both said jounce bumper cap and said jounce bumper nose retaining feature.

3. The shock absorber according to claim 2, wherein said jounce bumper cap defines an interface surface immediately adjacent said jounce bumper nose retaining feature, said elastomeric jounce bumper engaging said interface surface during the compression stroke of said shock absorber.

4. The shock absorber according to claim 3, further comprising an upper end cap closing said end of said pressure tube, said jounce bumper cap engaging said upper end cap.

5. The shock absorber according to claim 4, wherein a single piece component forms both said jounce bumper cap and said jounce bumper nose retaining feature.

6. The shock absorber according to claim 5, wherein said jounce bumper cap defines an interface surface immediately adjacent said jounce bumper nose retaining feature, said elastomeric jounce bumper engaging said interface surface during the compression stroke of said shock absorber.

7. The shock absorber according to claim 1, further comprising an upper end cap closing said end of said pressure tube, said jounce bumper cap engaging said upper end cap.

8. The shock absorber according to claim 1, wherein said jounce bumper nose retaining feature is a protrusion extending toward said elastomeric jounce bumper.

9. The shock absorber according to claim 8, wherein said protrusion is immediately adjacent and surrounding said through bore defined by said jounce bumper cap.

10. The shock absorber according to claim 8, wherein said protrusion is a single annular protrusion.

11. The shock absorber according to claim 1, wherein said through bore is parallel with said piston rod.

12. The shock absorber according to claim 1, wherein said jounce bumper cap defines an interface surface immediately adjacent said jounce bumper nose retaining feature, said elastomeric jounce bumper engaging said interface surface during the compression stroke of said shock absorber, said jounce bumper nose retaining feature extending from said interface surface toward said elastomeric jounce bumper.

13. The shock absorber according to claim 1, wherein said jounce bumper cap is a cup-shaped component which includes an annular wall parallel with said piston rod and spaced radially outward from said piston rod, said annular wall spacing said jounce bumper retaining feature from said pressure tube.

14. The shock absorber according to claim 1, further comprising a dirt shield attached directly to said jounce bumper cap.

15. The shock absorber according to claim 14, wherein said dirt shield is attached directly to said elastomeric jounce bumper.

* * * * *